Aug. 12, 1930.  C. F. CROMMETT  1,772,984
APPARATUS FOR PRODUCING CARBON BLACK
Filed Nov. 15, 1923

Inventor.
Charles F. Crommett
by Heard, Smith & Tennant.
Attys.

Patented Aug. 12, 1930

1,772,984

UNITED STATES PATENT OFFICE

CHARLES F. CROMMETT, OF MEDFORD, MASSACHUSETTS, ASSIGNOR OF ONE-THIRD TO LOUIS N. WHEELOCK, OF BOSTON, MASSACHUSETTS, AND ONE-THIRD TO WILFORD J. HAWKINS, OF BROOKLYN, NEW YORK

APPARATUS FOR PRODUCING CARBON BLACK

Application filed November 15, 1923. Serial No. 674,885.

This invention relates to an apparatus for producing carbon-black by the decomposition of a hydrocarbon or a mixture of hydrocarbons into their constituent elements carbon and hydrogen by the action of heat but without combustion.

One of the objects of the invention is to provide an apparatus for this purpose which is of simple construction and is inexpensive to manufacture and by which a high percentage of carbon can be recovered from the hydrocarbon.

Still another object of the invention is to provide an improved apparatus which is constructed so that the carbon will be removed from the heated zone as fast as it is formed thus preventing agglomeration of the particles of carbon due to the subjection of the carbon to a continued high temperature.

Other objects of the invention are to improve generally an apparatus for making carbon-black all as will be more fully hereinafter set forth.

In order to give an understanding of the invention I have illustrated in the drawings a selected embodiment thereof which will now be described after which the novel features will be pointed out in the appended claims.

Figure 1:
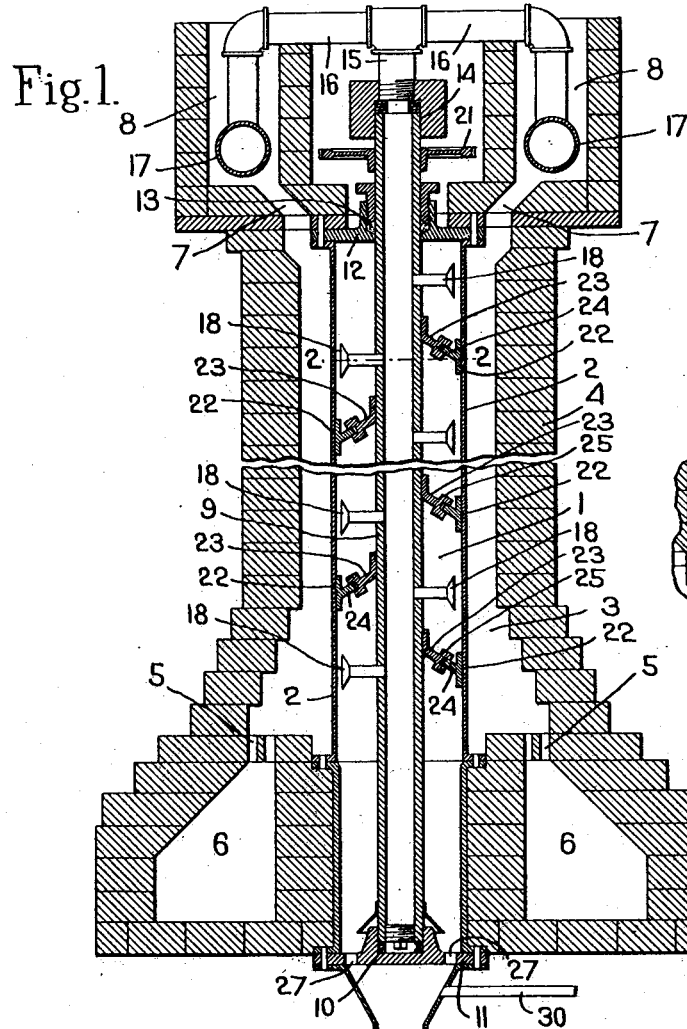
Fig. 1 is a vertical sectional view through an apparatus embodying my invention.

Where the decomposition of a hydrocarbon is effected by heating it in the presence of a catalyzing agent the endothermic reaction involved in the dissociation of the carbon and hydrogen appears to be largely a surface reaction, this being specially true in the decomposition of methane. By the term "surface reaction" is meant that the hydrocarbon which is decomposed is that which is brought into contact with the surface of the catalyzing member. I have taken advantage of this fact in the present invention by providing means whereby substantially all of the hydrocarbon which is to be treated is brought into contact with the heated surface of the catalyzing agent and by so doing have greatly increased the percentage of carbon which is recovered from the hydrocarbon.

While there are various ways in which this end may be accomplished I prefer to provide means including a chamber or retort in which the hydrocarbon is heated and also to provide means whereby all the hydrocarbon is delivered again the wall of the chamber thus bringing all the hydrocarbon into direct contact with the heated element.

Means are also provided for removing the carbon from the wall of the chamber as fast as it is formed and delivering it to a cool collecting chamber where it is not affected by the continued high heat. This chamber may be made in various ways without departing from the invention.

In the form herein illustrated the chamber or retort, which is indicated at 1, is constituted by a cylinder or tube 2 which will preferably have its inner face of some material having a catalyzing effect. For practical purposes I find that nickel may be used and in this case the tube may conveniently be made of nickel, although this invention contemplates the use of any material which will have the desired catalytic effect.

Means are provided for heating the tube 2 to the required temperature and for introducing the hydrocarbon gas into it and directing the gas against the wall thereof. While any means for heating the tube may be employed I have herein illustrated said tube as situated within a heating chamber 3 having walls 4 of firebrick. This chamber 3 communicates at 5 with combustion chambers 6 in which gas may be burned for producing the desired heat. After passing through the chamber 3 the products of combustion escape through the flues 7 to the preheating chambers 8 and thence pass to the stack or atmosphere.

Situated axially within the chamber 1 is a tube 9 through which the hydrocarbon gas is delivered to said chamber as will be presently described. This tube is rotatably mounted and is supported at its lower end in a step bearing 10 formed in a head 11 at the lower end of the chamber 1. The upper end of the tube 9 extends through the upper head 12 of the chamber 1 and suitable means are employed for packing or sealing the tube where it passes through said head so as to prevent leakage of gas.

Figure 4:
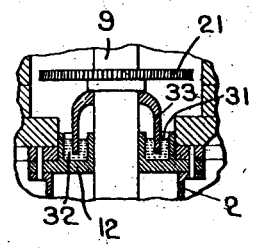
Fig. 4 is a fragmentary view showing a mercury seal for packing the tubular shaft 9.
Figure 3:
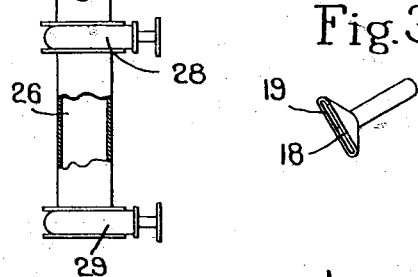
Fig. 3 is a view of the nozzle through which the hydrocarbon gas is delivered.
Figure 2:
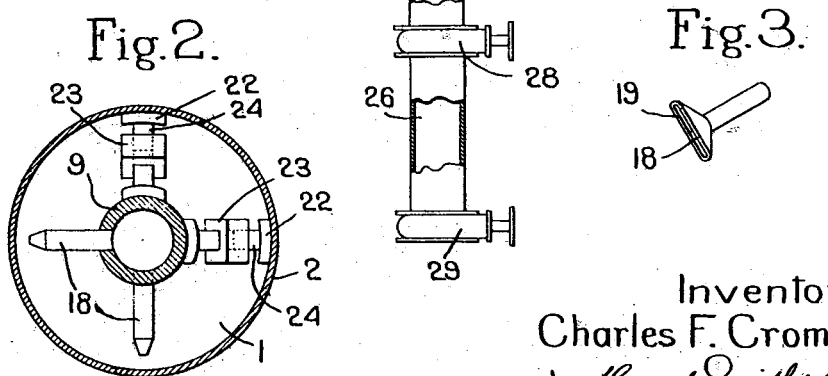
Fig. 2 is a section on the line 2—2, Fig. 1.

In Fig. 1 I have shown an ordinary stuffing box 13 for this purpose. In Fig. 4 a mercury seal arrangement is illustrated. In this construction the head 13 is formed with an annular groove or chamber 31 which is filled with mercury 32 and the portion of the tubular shaft 9 which is situated above the head 13 carries a bell-shaped packing member 33, the lower edge of which dips into the mercury thus making a mercury seal.

The upper end of the tube is connected to a supply pipe 15 as shown at 14 and the supply pipe 15 has two branches 16 that connect to preheating drums or containers 17 that are located in the preheating chambers 8. The pipe or tube 9 is capable of rotation and is provided with means for delivering the hydrocarbon gas against the inner face of the tube or cylinder 2. For this purpose I have provided the tube 9 with a plurality of laterally-extending nozzles 18, each of which will be preferably provided with an elongated delivery orifice or slit 19 directed toward the wall of the cylinder 2 so that as the tube 9 rotates each nozzle will deliver a sheet of gas against the wall of the cylinder 2 progressively.

The tube 9 may be rotated by any suitable means and I have herein illustrated for this purpose a gear 21 secured to the upper end thereof, which gear is connected to and driven by any desirable source of power. To permit the tube to thus rotate the connection 14 between the latter and the pipe 15 will preferably be a swivel connection.

With this arrangement all the hydrocarbon gas which is delivered into the chamber or retort 1 is directed against the wall of the chamber and is brought into direct contact therewith and hence if the wall of the chamber is made of some material which has a catalyzing effect all of the hydrocarbon delivered to the chamber will be brought into contact with and subjected to the action of the catalyzing agent. By maintaining the cylinder 2 at the proper temperature the hydrocarbon will be decomposed into hydrogen and carbon as it engages the wall of the chamber thus leaving a deposit of carbon on the wall. It is highly desirable to remove the carbon as fast as it is formed from the high temperature zone as the quality of the carbon-black produced is deleteriously effected when the carbon is subjected to high temperature for a considerable length of time.

I have, therefore, provided scrapers for scraping the carbon deposit from the inner wall of the tube 2. These scrapers are indicated at 22 and are carried by the rotating tube 9. There will preferably be one scraper for each nozzle, each scraper being arranged to scrape the zone of the tube 9 onto which the corresponding nozzle delivers the hydrocarbon gas.

Each scraper 22 is carried by a bracket 23 which is secured to the tube and a construction is preferably adopted by which the scrapers are adjustably or flexibly carried by the brackets so they will more readily follow any unevenness in the contour of the inner wall of the retort. One convenient way of accomplishing this is to provide each scraper 22 with an upwardly-inclined stem 24 which loosely fits in a socket 25 formed in the bracket. In this way the scrapers are yieldingly held against the wall of the cylinder 2 by the action of gravity and also by centrifugal action but the scrapers are permitted to yield, if necessary, to follow any slight variation in the circular contour of the cylinder 2.

The chamber 1 communicates at its lower end with a collecting chamber 26, this communication being provided for by means of ports 27 in the lower head 11. The collecting chamber 26 is provided with an inlet valve 28 and a discharge valve 29. A pipe 30 also leads from said collecting chamber for the conveying away of the hydrogen and undecomposed hydrocarbon gas.

In the operation of the device the retort 2 is heated to the desired temperature, which will be about 850° to 900° C. if the inner wall of the tube is of nickel or some similar catalyzing agent, and then hydrocarbon gas is delivered through suitable pipes (not shown) to the preheating drums 17, in which it is preheated, and from thence to the tube 9 from which it is delivered through the delivery orifices 19 of the nozzles 18 against the wall of the heated cylinder 2. It will be remembered that the tube 9 is rotating and, therefore, each nozzle will deliver a sheet of hydrocarbon gas directly against the wall of the tube in a zone. The gas will be decomposed as it strikes the wall of the tube thus forming carbon and hydrogen, and the carbon will be deposited on the wall of the cylinder, from which it is immediately removed by the scraper. The hydrogen gas which is thus formed and any undecomposed hydrocarbons pass down through the tube and out through the delivery pipe 30. As the carbon deposit is scraped from the walls of the cylinder it gravitates to the lower end of the cylinder. Normally the inlet valve 28 will be open and the discharge valve 29 will be closed but when a suitable amount of carbon has been collected in the inlet chamber the inlet valve is closed and the discharge valve is open thus allowing the accumulated carbon to be removed. The gas which is discharged through the discharge pipe 29 may be used in the combustion chambers for developing the necessary temperature in the heating chamber 3 or may be used for any suitable purpose.

An important feature of the present invention is that substantially all of the hydrocarbon gas to be treated is brought into direct contact with the heated wall of the chamber 1 thereby ensuring that all of the hydrocarbon gas will be subjected to the catalyzing effect. In this way a greater increased percentage of carbon deposit can be secured over that which is obtained by the methods now commonly used in making carbon-black.

Another important feature of the invention is the manner of removing the carbon deposit as fast as it is formed from the heated zone and into a cool collecting chamber.

I claim:

1. In a device of the class described, the combination with a hydrocarbon decomposing member, of means for delivering a stream of hydrocarbon gas in sheet form against said member at an angle thereto, means for maintaining said member at a sufficiently high temperature to cause dissociation of said hydrocarbon gas into carbon and hydrogen without combustion of said gas, and means for removing the carbon deposit as fast as it is formed.

2. In a device of the class described, the combination with a hydrocarbon decomposing member, of means for delivering a stream of hydrocarbon gas in sheet form against different portions of said member progressively and at an angle thereto, means for maintaining said member at a sufficiently high temperature to cause dissociation of the carbon and hydrogen without combustion of said gas, and means for removing the carbon deposit as fast as it is formed.

3. In an apparatus of the class described, the combination with a closed cylindrical retort, of means for delivering hydrocarbon gas to be dissociated directly against the inner wall thereof in a radial direction, and means for heating said retort to a sufficient temperature to cause dissociation of the carbon and hydrogen without combustion of said gas.

4. In an apparatus of the class described, the combination with a closed cylindrical retort, of means for delivering hydrocarbon gas directly against the inner wall thereof at substantially right angles thereto, means for heating said retort to a sufficient temperature to cause dissociation of the hydrocarbon gas without combustion of said gas, and means for removing the carbon deposit from said wall as fast as it is formed.

5. In a device of the class described, the combination with a closed cylindrical retort, of means to introduce hydrocarbon gas into said retort and to deliver it against the wall thereof at an angle thereto whereby substantially all the gas thus introduced is brought into contact with said wall, and means for heating said retort to a temperature sufficient to cause dissociation of the hydrocarbon gas without combustion of the gas.

6. In a device of the class described, the combination with a cylindrical retort, of a tube situated axially thereof and provided with laterally-extending nozzles for directing hydrocarbon issuing therefrom against the inner wall of the retort, means to heat said wall externally at a temperature sufficient to cause dissociation of the hydrocarbon gas without combustion, and means to rotate said tube.

7. In a device of the class described, the combination with a cylindrical retort, of a tube situated axially thereof and provided with laterally-extending nozzles for directing hydrocarbon issuing therefrom against the inner wall of the retort, means to heat said wall externally to a temperature sufficient to cause dissociation of the hydrocarbon gas without combustion, means to rotate said tube, and scrapers carried by said tube for scraping the carbon deposit from the wall as fast as it is formed.

8. In a device of the class described, the combination with a cylindrical retort from which air is excluded, of means for delivering hydrocarbon gas directly against the inner wall thereof in a generally radial direction at a plurality of points, means for heating said retort to a sufficient temperature to cause dissociation of the hydrocarbon gas into carbon and hydrogen without combustion, and means to remove the carbon deposit as fast as it is formed.

9. In a device of the class described, the combination with a hydrocarbon decomposing member, of means for delivering a plurality of streams of hydrocarbon gas against different portions of said member progressively, means for maintaining said member at a sufficiently high temperature to cause dissociation of the hydrocarbon gas into carbon and hydrogen without combustion, and means for removing the carbon as fast as it is formed.

10. In an apparatus for forming carbon black, the combination with a hydrocarbon decomposing member by which hydrocarbon is decomposed by heating and without combustion thereof, of gas-delivery means for delivering a stream of hydrocarbon gas in sheet form against said member, and means to maintain said member at a sufficiently high temperature to cause the hydrocarbon gas coming into contact therewith to be dissociated without combustion.

11. In an apparatus for forming carbon black, the combination with a hydrocarbon decomposing member, of gas-delivery means for delivering a stream of hydrocarbon gas in sheet form against said member, means to maintain said member at a sufficiently high temperature to cause the hydrocarbon gas coming into contact therewith to be dissociated without combustion, and means for removing the carbon deposit from the member as fast as it is formed.

12. In a device of the class described, the combination with a hydrocarbon decomposing member, of means for delivering a stream of hydrocarbon gas in sheet form against said member, means for producing a relative movement between said gas-delivery means and said member, and means for maintaining said member at a sufficiently high temperature to cause dissociation of said hydrocarbon gas into carbon and hydrogen without combustion.

13. In a device of the class described, the combination with a hydrocarbon decomposing member, of means for delivering a stream of hydrocarbon gas in sheet form against said member, means for producing a relative movement between said gas-delivery means and said member, means for maintaining said member at a sufficiently high temperature to cause dissociation of said hydrocarbon gas into carbon and hydrogen without combustion, and means for removing the carbon deposit as fast as it is formed.

In testimony whereof, I have signed my name to this specification.

CHARLES F. CROMMETT.